Patented Nov. 22, 1932

1,888,437

UNITED STATES PATENT OFFICE

SAMUEL T. SHERRICK, OF DENVER, COLORADO, ASSIGNOR OF FORTY-NINE ONE-HUNDREDTHS TO CHARLES DIEHL, OF DENVER, COLORADO

INSULATING COMPOSITION

No Drawing.   Application filed November 3, 1930.   Serial No. 493,099.

My invention relates to insulating compositions and particularly to a composition that is adapted for insulating refrigerators. The present invention is primarily intended to be used as insulating material for my refrigerating apparatus shown and described in my co-pending application Serial No. 493,098, filed Nov. 3, 1930. However, it is apparent that the present composition is useful wherever an insulating material is used.

An important object of this invention is to provide an insulating material that will maintain its insulating properties and not crack or otherwise become inefficient in extremes of temperature.

A further object is to provide a thick, tacky, insulating composition, whereby joints are effectively sealed.

Other objects reside in the use of waste material, such as old automobile tire inner tubes, and in the use of a non-drying shellac, as ingredients of the composition.

Still other objects reside in the particular ingredients used and in the proportions used, which will more fully appear in the course of the following description.

The composition comprises the use of rubber, bentonite, a resinous substance such as shellac or rosin gum, a solvent for the shellac or gum, and water. I have found that reclaimed vulcanized rubber may be utilized, providing the sulphur has been removed by raising the vulcanized rubber to a sufficiently high temperature. The bentonite is a well-known, jelly-forming, water-absorbent clay found mostly in the western part of the United States, and especially in the Rocky Mountain region. For the solvent, I prefer a non-drying solvent, such as triethanolamine $(N(CH_2.CH_2.OH)_3)$, since when it is used water may be easily mixed with the dissolved shellac.

Of course, the proportions may be varied to a considerable extent, and the following proportions are merely illustrative of what I have found to give satisfactory results:

40 pounds of reclaimed rubber
60 pounds of bentonite
1 pound of shellac or rosin gum in just enough triethanolamine to dissolve all of the shellac or gum
1 gallon of water Only enough water is used to make the composition tractable.

The shellac or gum is preferably dissolved apart from the mixture of the other ingredients, and then added thereto and the composition thoroughly mixed together.

In the use of the composition, it is plastered upon the surface to be insulated, to the desired thickness. I have found that if my composition is one-half inch or more thick, it will insulate my refrigerating apparatus the desired degree. The larger the apparatus or the more insulation desired, the thicker the insulation must be.

My composition will withstand extremes of temperature; for instance, from 32 degrees above zero to 70 degrees below zero, without impairing its efficiency. Due to the tackiness and tactability of my composition, the insulation on movable parts, such as lids, doors, etc., will effectively seal the cracks around the movable part.

What I claim and desire to secure by Letters Patent is:

A heat insulating composition comprising in approximate proportions of rubber 40 pounds, water-absorbent clay 60 pounds, resinous substance 1 pound, sufficient non-drying solvent to dissolve all of the resinous substance, and one gallon of water.

In testimony whereof I hereunto affix my signature.

SAMUEL T. SHERRICK.